(12) United States Patent
Guo et al.

(10) Patent No.: US 6,362,752 B1
(45) Date of Patent: Mar. 26, 2002

(54) KEYPAD WITH STROKES ASSIGNED TO KEY FOR IDEOGRAPHIC TEXT INPUT

(75) Inventors: Jin Guo, Sunnyvale; Carlos Isak McEvilly, Redwood City; Figen Ulgen, Palo Alto, all of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/220,308

(22) Filed: Dec. 23, 1998

(51) Int. Cl.[7] .................. H03K 17/94; H03M 11/00
(52) U.S. Cl. .................. 341/28; 341/22; 345/171; 400/110; 707/535
(58) Field of Search .................. 341/22, 28; 400/110, 400/484; 345/171; 707/535

(56) References Cited

U.S. PATENT DOCUMENTS

| | | | |
|---|---|---|---|
| 4,505,602 A | * 3/1985 | Wong | 400/110 |
| 4,872,196 A | * 10/1989 | Royer et al. | 341/28 |
| 4,879,653 A | * 11/1989 | Shinoto | 707/535 |
| 4,954,955 A | 9/1990 | Chiu | |
| 5,305,207 A | * 4/1994 | Chiu | 707/535 |
| 5,790,055 A | * 8/1998 | Yu | 341/28 |
| 6,094,666 A | * 7/2000 | Li | 707/535 |

FOREIGN PATENT DOCUMENTS

| | | |
|---|---|---|
| AU | PCT/AU89/00379 | 5/1990 |
| CN | 1015214 B | 12/1991 |
| CN | 1120695 A | 4/1996 |
| CN | 1142631 A | 2/1997 |
| CN | 1036548 C | 11/1997 |

* cited by examiner

*Primary Examiner*—Michael Horabik
*Assistant Examiner*—Timothy Edwards, Jr.
(74) *Attorney, Agent, or Firm*—Hugh C. Dunlop; Hisashi D. Watanabe

(57) ABSTRACT

An apparatus for inputting ideographic characters such as Chinese and Japanese characters, comprising an input pad having at least three rows and three columns of keys, forming a square with four corners and one corner key at each corner. At least two of the corner keys (1, 3, 7, 9) have corner-shaped stroke representations shaped approximately in correspondence with the corresponding corners. This gives a user a useful visual aid. Keys of a left-hand row (1, 4, 7) represent strokes that predominate in left-hand portions of characters and radicals, and keys of a right-hand row (3, 6, 9) represent strokes that predominate in right-hand portions of characters and radicals. A lower-left key (7) represents a stroke having a right hook and a lower-right key (9) represents a stroke having a left hook. These features lend themselves to ergonomic efficiency in character entry.

16 Claims, 2 Drawing Sheets

| NUMBER OF STROKE | START STROKE | COMPONENT | ID NUMBER |
|---|---|---|---|
| 笔数 | 首笔 | 部件 | 序号 |
| 1 | 一 | 一 | 2 |
|  | 丨 | 丨 | 235 |
|  |  | 亅 | 236 |
|  | 丿 | 丿 | 60 |
|  | 丶 | 丶 | 59 |
|  |  | 乀 | 389 |
|  |  | 乁 | 522 |
|  |  | 人 * | 523 |
|  | 乛 | 一 | 166 |
|  |  | 乛 | 167 |
|  |  | 乙 | 294 |
|  |  | 乛 | 338 |
|  |  | 乛 | 390 |
|  |  | 乚 | 431 |
|  |  | 乚 | 182 |
|  |  | 乚 | 183 |
|  |  | 乚 * | 511 |
| 2 | 一 | 二 | 187 |
|  |  | 十 | 27 |

STROKE CATEGORIES

| 1 | ⟨ | L 183 | ⌐ 511 | L 195 | L 463 | ∠ 367 | ∠ 512 | ⟨ 71 | ⟨ 192 | ↳ 533 | ↳ 516 | L 239 | ⌐ 542 | L 205 |
|---|---|---|---|---|---|---|---|---|---|---|---|---|---|---|
| 2 | ╲ | ╱ 1 | ╱ 78 | ╲ 342 | ╱ 292 | ╱ 87 | ╱ 58 | ╲ 6 | ╲ 310 | ╱ 370 | | | | |
| 3 | ⌐ | ⌐ 166 | ⌐ 390 | ⌐ 68 | ⌐ 46 | ⌐ 47 | ろ 283 | ろ 92 | ⌐ 541 | ⌐ 555 | | | | |
| 4 | ╱ | ╱ 60 | ╱ 115 | ╱ 121 | J 101 | ╱ 54 | ╱ 194 | | | | | | | |
| 5 | │ | ╱ 305 | | | | | | | | | | | | |
| 6 | ╲ | ⌐ 522 | ∧ 523 | | | | | | | | | | | |
| 7 | L | ʓ 294 | ⌐ 431 | ⌐ 41 | ⌐ 93 | ⌐ 62 | L 551 | L 54 | ʓ 513 | | | | | |
| 8 | ⁻₂ | ╱ 40 | ╱ 41 | ─ 43 | ╱ 146 | ╱ 18 | ╱ 21 | ─ 491 | | | | | | |
| 9 | ら | ⌐ | J 160 | ら 350 | J 99 | J 236 | J 79 | ろ 331 | ⌐ 551 | | | | | |

KEYPAD WITH STROKES ASSIGNED TO KEY FOR IDEOGRAPHIC TEXT INPUT

FIELD OF THE INVENTION

This invention relates to a keypad layout with strokes assigned to keys in a novel and convenient manner for input of ideographic text such as Chinese and Japanese.

BACKGROUND OF THE INVENTION

For many years developers of complete keyboards have struggled with the problem of input of Chinese and Japanese text, because these languages use a very large alphabet of characters, more than 13,000 characters, and it is a great problem attempting to devise a keyboard that permits entry of such a large variety of characters from a more limited number of keys.

Many proposals exist for using an intentionally standard QWERTY keyboard for entry of ideograph text (e.g. Chinese and Japanese). Such a keyboard has about 36 keys, plus some punctuation keys, and this is a manageable number of keys for two-handed operation and for convenience of size in a desktop system. Examples of such input systems can be found in U.S. Pat. No. 4,954,955 of Chiu and is in Chinese Patent No. CN1036548C. The former of these has a set of keys designated for entry of strokes and another set for entry of radicals (multi-stroke character sub-elements). It also assigns one frequently used character to each key which can be entered using a shift key. The proposed also divides the keyboard into a left-hand set of keys and a right-hand set of keys and enables stroke coding and component coding.

The increasing demand for smaller and smaller devices is driving keyboard design towards one-handed keypad data entry. A keypad typically has only 12 keys (but may have as many as 16 or 24 keys) and is typically used on telephones, mobile telephones and similar diveces where one hand of the user is engaged in holding the device (e.g. the telephone earpiece with mobile phone handset) and only one hand is free for data entry.

U.S. Pat. No. 5,952,942 which issued on Sep. 14, 1999 (assigned to the assignee of the present invention) proposes a method of Chinese text entry using a keypad and using the widely-established pinyin scheme of phonetic representation of Chinese text form a standard US-Style telephone keypad where each key has letters of the roman alphabet assigned to it. Software as is described in U.S. patent application Ser. No. 08/806,504 of Chen (assigned to the assignee of the present invention) operates to disambiguate the intended pinyin entry.

Although pinyin data entry is a useful solution, not all Chinese speakers are well versed in pinyin data entry. The more natural form of Chinese data entry is a stroke-based writing form, directly creating characters from strokes. The Chinese government has published a national standard of strokes and character components, which lists 560 standardized strokes and character components. In the standard, a character component comprises from 1 to 16 strokes.

Others have proposed schemes of character entry using a 9 or 10-key keypad which are based on entry of strokes and other character components.

As a first example, Chinese Patent No. CN1015214B assigns Chinese representations of numbers to keys, (—, =, ≡, 九) and uses the same keys for entry of strokes that have some similarity to the Chinese numerals. As an example, the character for "1" is a single horizontal stroke, so the key "1" is used for entry of single horizontal strokes, while the character for "9" (九) includes a right hook. It is a drawback of this scheme, however, that the Chinese characters for digits "0" to "9" do not encompass all the strokes required for a full range of character entry. It is a further drawback that a user may be confused over which key to press between two keys that use broadly similar strokes.

Another scheme is described in Chinese Patent Application No. 93102274, in which the phonetic association that a user perceives in a given digit is the association to be used in generating a character component. As an example, in Chinese, "3" is pronounced "san" and is commonly associated with "san dian sui" which is the phonetic pronunciation for "three dots" so the scheme requires that key 3 is used for entry of a dot.

Problems with the above scheme lie in the constraint that they rely on the user's own acquired associations that the user makes between digits and strokes.

A scheme that is not constrained by such previously learned associations is described in Chinese Patent Applications No. CN1142631A and CN1120695A, in which three categories of character components are mapped to keys on a keypad:—lines, corners and boxes. Whereas such a scheme is flexible, it does not have any inherent ergonomic efficiency, as there is no intuitive relationship between keys and character components. The user must learn these associations himself. Also, in decoding key entry, it is a drawback that the user must enter not just one to three initiated strokes, but also two or one of the last strokes of a character. This requirement causes the user to have to think ahead to the last stroke of a character to enable complete character entry. It is believed that this requirement is imposed for disambiguation because the selection of strokes and boxes inadequately spans the range of stroke components required for data entry and therefore inadvertently disambiguates strokes.

There is a need for an improved keypad for stroke-based ideographic text entry where each key has a clear and reasonably unambiguous stroke meaning, where the selection of strokes assigned to keys thoroughly spans the universe of possible strokes and where there is an intuitive association in the user's mind between a key or its location and the stroke or component it represents.

DETAILED DESCRIPTION OF THE PREFERRED EMBODIMENTS

Figures 1, 2:
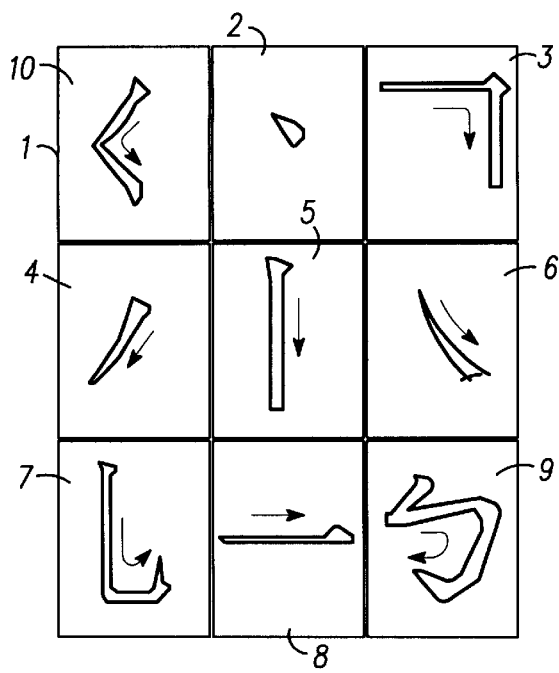
FIG. 1 illustrates a keypad of 9 keys in accordance with the present invention.
FIG. 2 is a table taken from the national standard for character components.

FIG. 1 illustrates a keypad 10 of nine keys 1–9 in a standard 3×3 arrangement. Each key has a stroke component assigned to it (as well as a digit, not shown).

Key 1 has a "turn right" component comprising a vertical (south) or backslash (south-west) stroke followed by a turn to the right.

Key 2 has a dot.

Key 3 has a horizontal-and-turn component (with no hook).

Key 4 has a left stroke—i.e. down-and-left (south-west).

Key 5 has a vertical stroke (straight down with little or no slope).

Key 6 has a right down-stroke (south-east).

Key 7 has a right hook component—i.e. the end of the stroke is right with an upward turn.

Key 8 has a horizontal stroke (left-to-right), and

Key 9 has a left hook component (ending with a turn to the left and a small upward "hook" stroke).

It is a feature of Chinese writing that pen movement is generally top-to-bottom. The exceptions to this rule are left-hooks and right-hooks, where the stroke ends with a short upward component.

The above keypad layout has the following notable and useful features. First, the four corners of the keypad include components that are generally corner-shaped and generally shaped to coincide with the corners of a hypothetical box drawn around the keypad. In keys 3 and 7 have components that are right-angles that coincide with upper right and lower left corners of a box. In this manner, a user can intuitively locate corner-shaped strokes by looking to the corresponding corner of the hypothetical box surrounding the keypad.

Second the corner-shaped components are generally positioned in locations that predominantly correspond to the positions where these components appear in the majority of characters that include these components. By way of explanation, Chinese and Japanese characters are formed in a notional box shape. Writers are taught to imagine a box and to locate strokes and character components in particular positions in the box. Hooks (short upward strokes) always appear in the lower part of this notional box. Right hooks are mostly used in the lower-left hand corner of the box and left hooks are mostly used in the lower right-hand corner. Thus, these components are located on the keypad in positions that correspond to the most frequently occuring positions of those components in written characters (i.e. in the quarter in which they most frequently occur but of least in the vertical half in which they most frequently occur). The same is true (to a less rigid extent) to the slash-and-turn character on key 1 and the horizontal-and-turn character on key 3, which most frequently appear in top-left and top-right corners of written characters.

Another feature is the left down stroke and the right downstroke, which appear on keys 4 and 6. These appear in the left and right-hand sides of the keypad and these are strokes that generally occur on the left and right hand sides respectively of written characters.

In operation, a user presses the keys 1–9 in a sequence according to the strokes of a character he wishes to generate. Each keystroke generates a digit which is delivered to a character search engine in a manner described in greater detail below. The user has one simple rule to which he needs to work, which is as follows. If a component includes a hook, the user must select one of keys 7 and 9 (according to the direction of the hook). Otherwise, the user selects one of keys 1 through 6 and 8 according to the shape of the character component being generated. In other words, a hook is generated with key 7 or 9 regardless of what other strokes and turns make up that component.

Turning now to FIG. 2, a table is shown taken from the national standard of character components. The portion of the table shown gives the seventeen components of the standard that are single-stroke components and below these, it gives the first two components that are 2-stroke components. The standard defines 560 components in total. The right hand column give a 3-digit number from 1 to 560 which identifies the component. This table is given for purposes of explanation of FIG. 3.

Figures 3, 4:
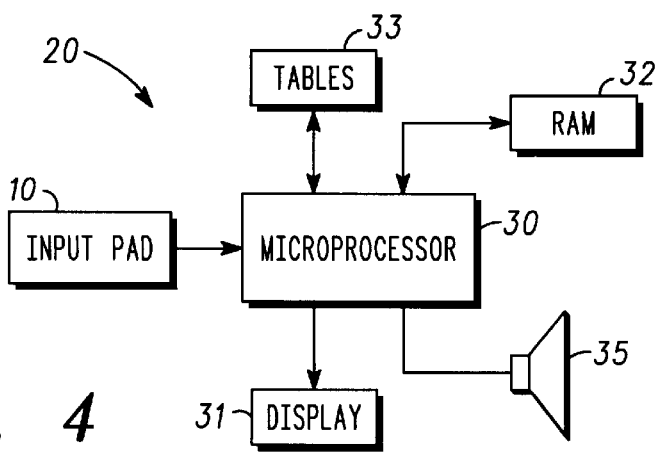
FIG. 3 is a table of stroke assignments that the keypad keys represents.
FIG. 4 is a circuit diagram of a data entry system in accordance with the present invention.

FIG. 3 is a table of strokes assigned to keys of the keypad (i.e. strokes which may be represented by keys of the keypad). As illustrated, there are 13 strokes that may be represented by key 1. These thirteen strokes all begin with a down stroke (or down-and-left stroke) followed by a right turn. Some have a left turn also after a right turn, but this is ignored. None has an upward hook. It can be seen that the first component, No. 183, is one of the one-stroke components defined in the standard. The second component, No. 511, is also a defined one-stroke component. The other components are strokes that can be found as elements of other multi-stroke components in the standard. A careful researcher might find additional right-turn strokes that make up components of the standard, but it is of no consequence that they are not listed, the point to note is that they may be represented by key 1. Similarly, for stroke 5 the representative stroke listed in the table is a downward stroke of component No. 305 (which is a 3-stroke component not shown in FIG. 2) but one could also list component No. 235 (one-stroke downstroke component) against Key No. 5

The inventor, after careful research, has selected the nine strokes shown in FIGS. 1 and 3 as representative of the entire universe of strokes that make up the standard stroke components, such that there is no stroke of any component of the standard that cannot be categorized as one of these 9 strokes. Moreover the categorization by the user into one of the nine strokes is easy and intuitive. Furthermore the simplicity of characterization of a stroke onto one of the 9 categories is facilitated by the correspondence between the position of the corresponding key on the keypad and the position of corresponding strokes in a character (as described above). Thus, the strokes represented by keys 1 and 3 tend to be strokes that appear in the upper half of a character and the strokes represented by keys 7 and 9 tend to be strokes that appear at the bottom of a character. Also, the strokes represented by keys 1 and 7 tend to be strokes that appear on the left-hand side of a character while the strokes of keys 3 and 9 tend to be strokes that appear on the right-hand side of a character. Obviously there are exceptions to these rules, but these are rules which generally assist in the intuitive selection of a key to represent a given stroke.

FIG. 4 illustrates a handheld device 20, such as a cellular telephone for implementing data entry using the keypad of FIG. 1. The device comprises a microprocessor 30, a display 31, a random-access memory 32, a memory of tables 33 (which can be ready only or EEPROM or a hard drive) and an optional speaker 35.

In operation, a user enters strokes through keypad 10 and the microprocessor 30 searches a table in memory 33 for a character or set of candidate characters identified by the sequence of digits received from the keypad 10. A look-up operation for characters that correspond to an input digit stream is described more fully in co-pending patent application Ser. No. 08/806,504 filed on Feb. 24, 1997, which is incorporated herein by reference.

When a character or set of candidate characters have been identified from the memory and displayed on display 31. The keypad 10 or some other "select" key or "next character" key can be used to select the displayed character or a selected one of a series of displayed candidate character. Alternatively, the speaker 35 can be used to enunciate the character or the candidate characters.

The above description has been given by way of example only and modifications of detail can be made within the scope and spirit of the invention.

Thus, an apparatus has been described for inputting ideographic characters comprising an input pad 10 having at least three rows and three columns of keys, forming a square with four corners and one corner key (1, 3, 7, 9) at each corner, wherein at least two of the corner keys (1, 3, 7, 9) have corner-shaped stroke representions shaped approximately in correspondence with the corresponding corners. The four corner keys have corner-shaped stroke representions shaped approximately in correspondence with the corresponding corners. A look-up table is stored in the memory 33. The look-up table comprises ideographic characters sorted into a plurality of groups, each group being represented by a common sequence of input keys. A user enters at least a first and a second input key entry, and based on a sequence of input key entries received, the microprocessor 30 identifies at least one ideographic character corresponding to the sequence of input key entries.

Keys 1, 4 and 7 of a left-hand column of the keypad preferably represent strokes that predominate in left-hand portions of characters and radicals (i.e. character sub-elements) and keys 3, 6 and 9 of a right-hand column preferably represent strokes that predominate in right-hand portions of characters and radicals.

A computer program is stored in read-only memory associated with the microprocessor 30 and has instructions and data which, when loaded into the microprocessor or other computer, cause the microprocessor to receive digits from the keypad in which digits 1, 3, 7 and 9 represent strokes shaped approximately in correspondence with a right-turn stroke, a horizontal-and-turn stroke, a right hook and a left hook respectively; and cause the microprocessor or other computer to perform a look-up operation to determine at least one ideographic character corresponding to a sequence of digits representing such strokes. In another aspect, the computer program causes the microprocessor or other computer to receive digits where digits 1, 4 and 7 represent predetermined strokes that predominate in left-hand portions of characters and radicals, and digits 3, 6 and 9 represent predetermined strokes that predominate in right-hand portions of characters and radicals.

We claim:

1. An apparatus for inputting ideographic characters comprising an input pad having at least three rows and three columns of keys, forming a square with four corners and a corner key at a lower-left corner of the square, wherein the corner key has a corner-shaped stroke representation shaped approximately in correspondence with the lower-left corner;

wherein the four corner keys have corner-shaped stroke representations.

2. The apparatus of claim 1, wherein a left-hand middle row key has a southwest sloping stroke representation and a right-hand middle row key has a southeast sloping stroke representation.

3. The apparatus of claim 1, wherein a left-hand lower row key has a right hook stroke representation and a right-hand middle row key has a left hook stroke representation.

4. The apparatus of claim 1, wherein a center key has a downward stroke representation.

5. The apparatus of claim 1, wherein a top-row center key has a dot representation.

6. The apparatus of claim 1, wherein a lower-row center key has a horizontal stroke representation.

7. The apparatus of claim 1, wherein a lower-right corner key has a lower-right corner-shaped stroke representation with a left hook.

8. The apparatus of claim 1 further comprising:

a microprocessor coupled to the input pad;

a memory, coupled to the microprocessor; and a look-up table, stored in the memory, look-up table comprising ideographic characters sorted into a plurality of groups, each group being represented by a common sequence of input keys.

9. The apparatus of claim 1, wherein the at least two corner keys include a top-right corner key and a lower-left corner key.

10. The apparatus of claim 9, wherein the lower-left corner key has a corner-shaped stroke representation with a right hook.

11. The apparatus of claim 1, wherein the at least two corner keys include a top-right corner key and a top-left corner key.

12. The apparatus of claim 11, wherein the top-left corner key has a "<" shaped stroke representation.

13. A method for inputting ideographic characters comprising the steps of:

providing an input keypad having at least three rows and three columns of keys, forming a square with four corners and a corner key at a lower-left corner of the square, wherein the corner key has a corner-shaped stroke representation shaped approximately in correspondence with the lower-left corner;

wherein the four corner keys have corner-shaped stroke representations;

mapping a stroke to each input key;

receiving at least a first and second input key entry; and based on a sequence of input key entries received, determining at least one ideographic character corresponding to the sequence of input key entries.

14. An apparatus for inputting ideographic characters comprising an input pad having at least three rows and three columns of keys, wherein keys of a left-hand column represent strokes that predominate in left-hand portions of characters and radicals and keys of a right-hand column represent strokes that predominate in right-hand portions of characters and radicals.

15. An article of manufacture comprising a data storage medium having stored thereon instructions and data which, when loaded into a computer cause the computer to:

receive digits from a keypad in which digits 1, 3, 7 and 9 represent strokes shaped approximately in correspondence with a right-turn stroke, a horizontal-and-turn stroke, a right hook and a left hook respectively; and perform a look-up operation to determine at least one ideographic character corresponding to a sequence of digits representing such strokes.

16. An article of manufacture comprising a data storage medium having stored thereon instructions and data which, when loaded into a computer cause the computer to:

receive digits from a keypad in which digits 1, 4 and 7 represent predetermined strokes that predominate in left-hand portions of characters and radicals, and digits 3, 6 and 9 represent predetermined strokes that predominate in right-hand portions of characters and radicals; and perform a look-up operation to determine at least on ideographic character corresponding to a sequence of digits representing such strokes.

* * * * *